United States Patent [19]
Booz et al.

[11] Patent Number: 5,769,994
[45] Date of Patent: Jun. 23, 1998

[54] METHOD OF MANUFACTURING AN ELONGATED, LIGHTWEIGHT FORMABLE ARTICLE

[75] Inventors: Rustam Booz; Andrew Farrar, both of Cambridge; Arthur M. Ganson, Somerville, all of Mass.

[73] Assignee: HandsOnToys, Inc., Woburn, Mass.

[21] Appl. No.: 613,054

[22] Filed: Mar. 8, 1996

Related U.S. Application Data

[63] Continuation-in-part of Ser. No. 265,809, Jun. 27, 1994, Pat. No. 5,498,190.

[51] Int. Cl.$^6$ .......................... B29C 63/18; B29C 65/14; B29C 65/52
[52] U.S. Cl. ....................... 156/244.13; 156/294
[58] Field of Search .................... 156/293, 294, 156/91, 272.4, 264, 244.13, 303.1; 446/85, 87, 107, 116, 119, 370, 373, 374, 486, 488, 490; 132/246; 434/278, 279, 281; 482/83; 273/DIG. 4, DIG. 8

[56] References Cited

U.S. PATENT DOCUMENTS

| | | | |
|---|---|---|---|
| 1,334,813 | 3/1920 | Stanek . | |
| 2,392,024 | 1/1946 | Couri | 446/374 |
| 2,718,485 | 9/1955 | Samuely | 156/91 |
| 3,176,428 | 4/1965 | Slingluff | 46/17 |
| 3,236,007 | 2/1966 | Abeson | 446/374 |
| 3,476,086 | 11/1969 | Way | 119/29 |
| 3,620,875 | 11/1971 | Guglielmo | 156/272 |
| 3,830,011 | 8/1974 | Ochrymowich | 46/29 |
| 4,100,007 | 7/1978 | Van Zeeland | 156/294 |
| 4,213,486 | 7/1980 | Samour et al. | 156/187 |
| 4,384,717 | 5/1983 | Morris | 273/156 |
| 4,648,414 | 3/1987 | Fox et al. | 132/43 |
| 4,666,417 | 5/1987 | Hillman | 446/267 |
| 4,778,184 | 10/1988 | Fleischer | 273/155 |
| 4,806,186 | 2/1989 | Sirkin et al. | 156/293 |
| 4,927,402 | 5/1990 | Fables et al. | 446/487 |
| 4,986,791 | 1/1991 | Alfaro | 446/361 |
| 5,112,268 | 5/1992 | Klaus | 446/489 |
| 5,165,428 | 11/1992 | Stohr | 132/246 |
| 5,180,325 | 1/1993 | Eddins et al. | 446/385 |
| 5,186,457 | 2/1993 | Cole | 273/58 K |
| 5,288,359 | 2/1994 | Stobbie, IV et al. | 156/294 |
| 5,295,595 | 3/1994 | Gobidas et al. | 211/105.1 |
| 5,310,376 | 5/1994 | Mayuzumi et al. | 446/107 |
| 5,498,190 | 3/1996 | Ganson | 446/85 |

FOREIGN PATENT DOCUMENTS

| | | | |
|---|---|---|---|
| 2746287 | 4/1979 | Germany | 156/294 |
| 942148 | 11/1963 | United Kingdom | 156/294 |

*Primary Examiner*—Steven D. Maki
*Attorney, Agent, or Firm*—Brian M. Dingman

[57] ABSTRACT

A process for manufacturing an elongated, formable article, having an elongated foam body with a flexible wire embedded therein, including the steps of: providing an elongated foam body; substantially entirely coating a flexible wire with an adhesive; and inserting the adhesive-coated wire into the foam body along its longitudinal axis to form the article.

10 Claims, 7 Drawing Sheets

FIG. 9 though of course the invention is not limited to this case.

METHOD OF MANUFACTURING AN ELONGATED, LIGHTWEIGHT FORMABLE ARTICLE

REFERENCE TO RELATED APPLICATION

This application is a continuation in part of application Ser. No. 08/265,809, filed on Jun. 27, 1994 now U.S. Pat. No. 5,498,190.

FIELD OF INVENTION

This invention relates to a process for manufacturing an elongated, formable article.

BACKGROUND OF INVENTION

There are many types of children's construction toys on the market. Many such construction toys consist of interconnectable rigid toy pieces. These pieces are typically interconnected with connector elements that may be either separate from, or integral with, the structural members. The child is limited in the use of the toy by the size and shape of the toy set pieces and connector elements.

Some such interconnectable construction toy sets use flexible structural members, such as plastic-coated wire pieces with special end structures that allow the pieces to be interconnected at their ends. Since the pieces are not adapted to be interconnected at places other than their ends, the use of the toy is inherently limited. Additionally, the relatively thick wire, and relatively dense plastic coating on the wire, make the pieces relatively heavy, which effectively limits the size of the toy pieces.

It would be desirable to design a construction toy set in which the toy structural members were extremely light weight, so that there was less limitation on the size of the toy pieces. Additionally, it would be desirable to allow the pieces to be interconnected intermediate their ends, so that the potential uses of the pieces are limitless.

These goals can be accomplished with a foam tube with a pliable metallic core. One such type of article is disclosed in Fox et al., U.S. Pat. No. 4,648,414, issued on Mar. 10, 1987. The light weight articles disclosed in the Fox et al. patent are disclosed as particularly useful as hair curling rods or wrist bracelets.

The Fox et al. bendable articles are made by extruding adhesive coating onto a continuous wire strand, and then extruding plastic foam onto the adhesive-coated wire. The foam-coated wire is then cut into short lengths which then have plastic end caps glued to the end of the foam and the end of the metal wire.

The Fox et al. coextrusion technology requires that the metallic core be the same length as the foam body. To prevent injury from the wire, it is thus necessary to take the additional manufacturing step of capping the pieces. These caps also add to the weight of the pieces, and alter their appearance.

SUMMARY OF INVENTION

It is therefore an object of this invention to provide a process for manufacturing an elongated, formable article that is particularly adapted for use as a construction toy, in which the toy pieces can be interconnected in virtually any location and virtually any manner.

It is a further object of this invention to provide such a process for manufacturing elongated, formable articles that are consistent in appearance along their lengths.

It is a further object of this invention to provide such a process that is capable of manufacturing such articles without the need for end caps.

It is a further object of this invention to provide such a process that does not require co-extrusion.

It is a further object of this invention to provide such a process that does not require that the metallic core be coextensive with the foam body.

This invention features processes for manufacturing elongated, formable articles having an elongated foam body with a flexible wire embedded therein. A flexible wire is substantially entirely coated with an adhesive, and then the adhesive-coated wire is inserted into the foam body along its longitudinal axis to form the article. In one case, the adhesive-coated wire is originally longer than the elongated foam body, and the adhesive coated wire is cut to a length no longer than the foam body before it is inserted into the foam body. This feature allows the wire to be pre-coated with an adhesive such as a hot-melt adhesive which can be activated after it is placed in the foam body, but allows the adhesive-coated wire to be easily handled due to the fact that the adhesive is a solid.

To help prevent the ends of the wire from poking through the foam body during wire insertion, and/or in the manufactured article, the ends of the wire may be enlarged before it is inserted into the foam body. This may be accomplished with ends which are integral with the wire, for example by coining the wire ends, or may be accomplished with separate structures such as caps which can be bound to the ends of the wire. If the wire ends are enlarged, this preferably occurs after the adhesive-coating step. The wire is preferably aluminum and may be 0-temper aluminum.

The foam body may be made from any type of foam such as polyurethane or polyethylene, with or without additives. Closed cell foams are preferred due to their toughness and durability. The elongated foam body may be provided with a central longitudinal aperture, which may have a round cross section and a diameter essentially the same as the diameter of the adhesive-coated wire. This may be accomplished by extruding foam with a central aperture and then cutting the foam off to the desired length to make the foam bodies. The wire diameter is preferably equal to the diameter of the central longitudinal aperture in the foam body, plus or minus approximately 20%. The wire may have a diameter between $\frac{1}{32}$" and $\frac{1}{2}$". The size of the wire typically adheres to the following principle: The ratio of the foam OD to the diameter of the wire will range from 4:1 to 20:1 for a 2.5 lb per cubic foot (pcf) foam. The upper range of this ratio will change as the foam density changes by a factor of: 2.5/density of foam used. For example, a 1.25 lb pcf foam would have the ratio of 4:1 to 2.5/1.25×20:1 or 40:1. A 5 lb pcf foam would have the ratio of 2:1 to 10:1. In the case of non-cylindrical bodies, the measurement used for this ratio should be the diameter of the largest circle that can be drawn completely within the body. The adhesive coated wire may be inserted into the foam body by pushing the wire into the foam body aperture.

When the adhesive is a heat activated adhesive, the method further includes the step of activating the adhesive after the wire is inserted into the foam body using means such as electromagnetic wave induction or heat. The wire is preferably shorter than the foam shape by between $\frac{1}{8}$" and 2". More generally, the ends of the wire are preferably each within a distance no greater than the diameter of the foam body (or the diameter of the largest circle that can be drawn completely within a non-cylindrical foam body) from either end of the foam body.

The elongated, formable articles are interconnected to one another by wrapping engagement. The combination of the foam flexibility and compressibility, and the wire softness and strength, allow the articles to be twisted around one another so that there is no need for structures that are designed to accomplish the interconnection as is necessary in other construction toys. Such wrapping interconnection is accomplished by wrapping one shape around at least the entire circumference of the other shape. This uses at least 3.14 times the piece diameter length of the wrapping piece. In order for the pieces to be used as a construction toy, it is necessary that at least some of the pieces have a sufficient length to diameter ratio to allow this wrapping interconnection to one or more other pieces, while leaving sufficient space for interconnection of other pieces through a variety of interconnection means such as additional wrapping or appropriately-sized holes through other foam pieces without metallic cores. It has been found that it is necessary for such pieces to have a length to diameter ratio of at least about 24:1 to accomplish this result. It is preferred that the set include some tubes with length to diameter ratios of about 24:1, 36:1, and 48:1 to provide variety in the use of the toy.

BRIEF DESCRIPTION OF THE DRAWINGS

Other objects features and advantages will occur to those skilled in the art from the following description of preferred embodiment, and the accompanying drawings, in which.

DESCRIPTION OF THE PREFERRED EMBODIMENTS

Figure 1:
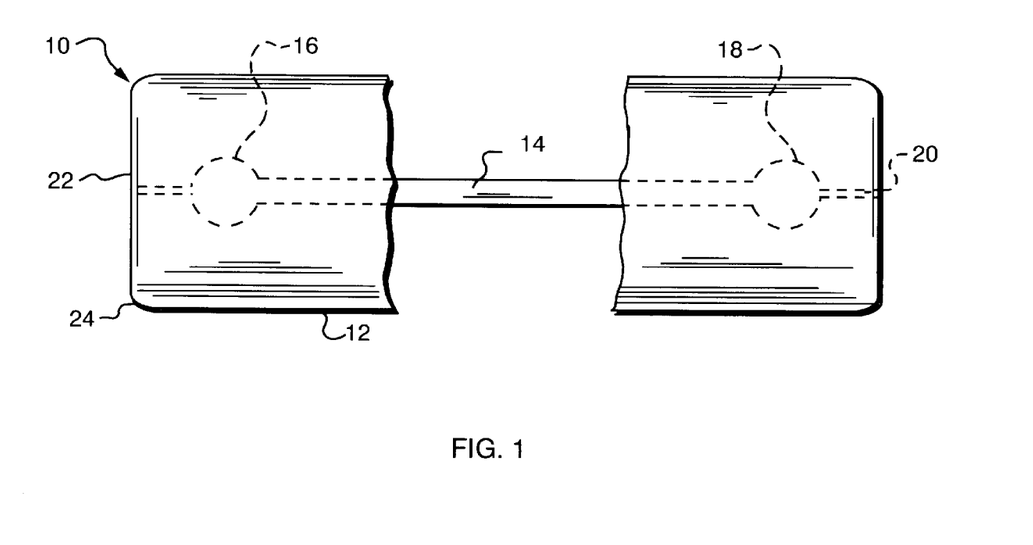
FIG. 1 is a side view of one form of a flexible foam construction toy made by the method of this invention with a portion of the toy removed to detail the interior structure.
Figure 2A:
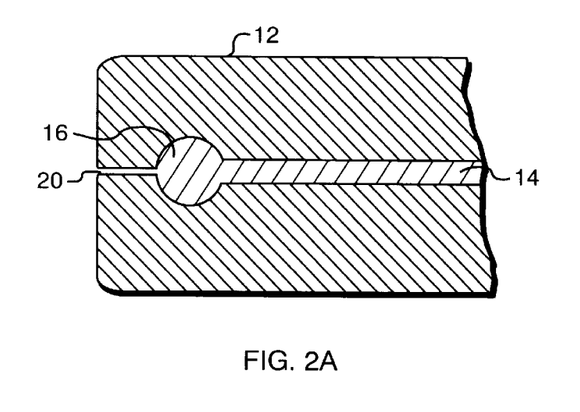
FIG. 2A is a partial cross sectional view of the toy of FIG. 1.
Figure 2B:
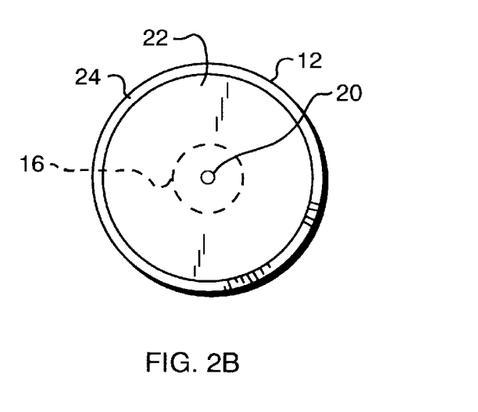
FIG. 2B is an end view of the toy of FIG. 1.

There is shown in FIGS. 1 and 2 flexible foam construction toy 10 made by the method of this invention. Toy 10 is made from an elongated foam body 12 having central aperture 20 which is typically approximately 1/32" to 1/2" in diameter. The foam body can take a variety of cross-sectional shapes, such as round, rectangular or triangular, for example. Formable wire 14 having enlarged ends 16 and 18 is embedded within body 12 along aperture 20. Enlarged ends 16 and 18 in this case are formed by enlarging the wire ends, for example by coining. Wire 14 is preferably 0-temper aluminum wire having a thickness between 1/32" and 1/2". The size of the wire adheres to the following principle: The ratio of the foam OD to the diameter of the wire will range from 4:1 to 20:1 for a 2.5 lb per cubic foot (pcf) foam. The upper range of this ratio will change as the foam density changes by a factor of: 2.5/density of foam used. For example a 1.25 lb pcf foam would have the ratio of 4:1 to 2.5/1.25×20:1 or 40:1. A 5 lb pcf foam would have the ratio of 2:1 to 10:1. In the case of non-cylindrical bodies, the measurement used for this ratio should be the diameter of the largest circle that can be drawn completely within the figure. As explained below, wire 14 is coated with adhesive 15 before insertion into aperture 20.

In the preferred embodiment, the wire has a nominal diameter of 0.125" uncoated, and 0.136" after coating with heat-activated adhesive. Foam tubes with a nominal 1" diameter are extruded with a central aperture with a nominal diameter of 0.135".

Figure 3:
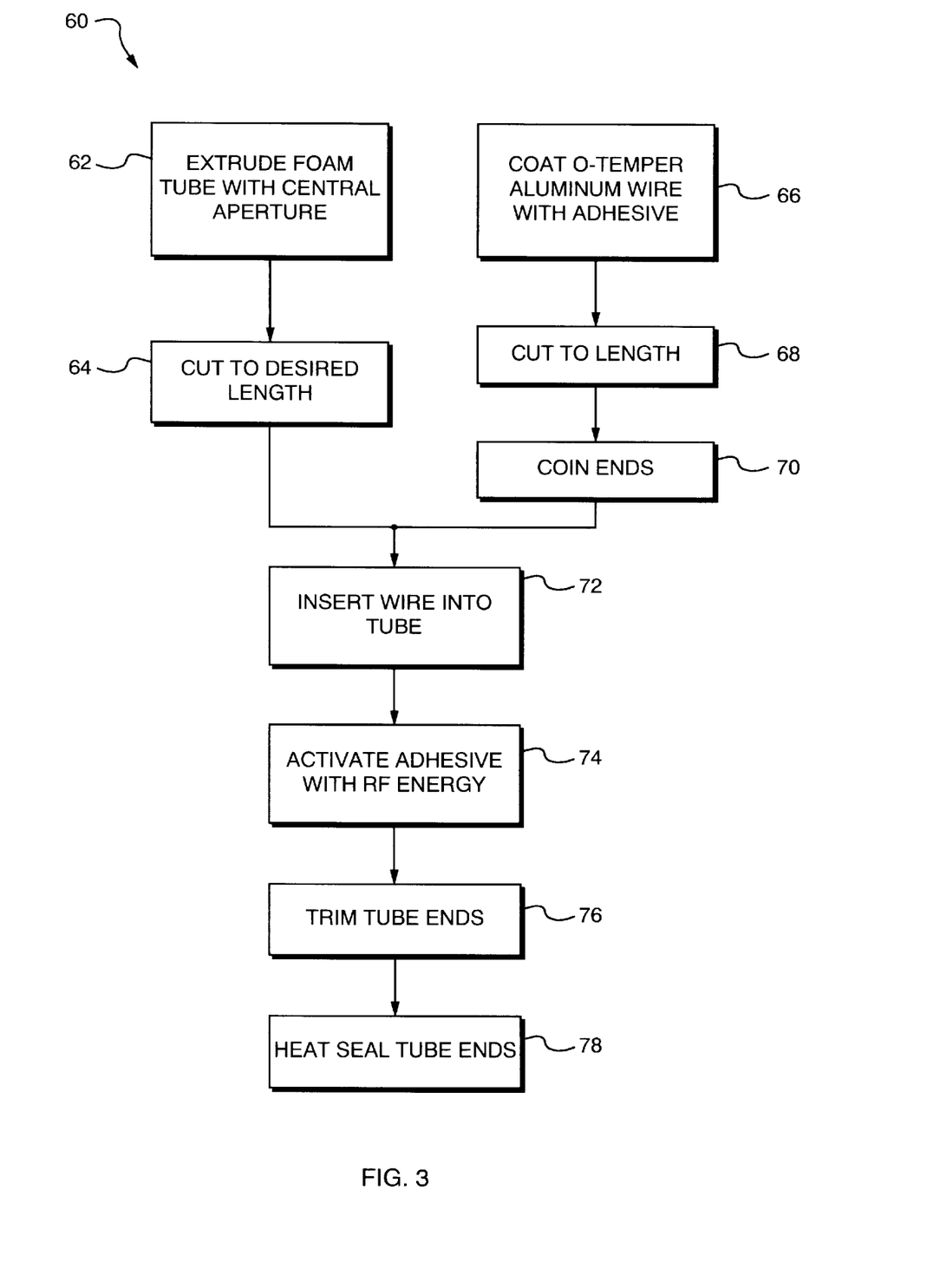
FIG. 3 is a flow diagram of one preferred embodiment of the method of this invention.

FIG. 3 details flow chart 60 of the preferred process according to this invention for manufacturing an elongated, formable article such as that shown in FIGS. 1 and 2. A cylindrical foam tube with a central aperture is extruded, step 62, and then cut to the desired length, step 64. In a separate process, 0-temper aluminum wire of the desired diameter is coated with an adhesive such as a glue, epoxy, heat-activated adhesive or another adhesive which assists in maintaining the wire in place in the foam body. Preferably, the adhesive is Worthen Industries/Upaco Adhesive Division #9419-D heat-activated adhesive. The aluminum wire is then cut to length and the ends are coined, steps 68 and 70. These two process steps are accomplished to create a finished wire piece that is slightly shorter than the length of the foam body. The wire ends are typically each within about 1/16 41 to 1" from the foam tube ends in the finished article; about 1/4" is preferred.

Figure 4A:
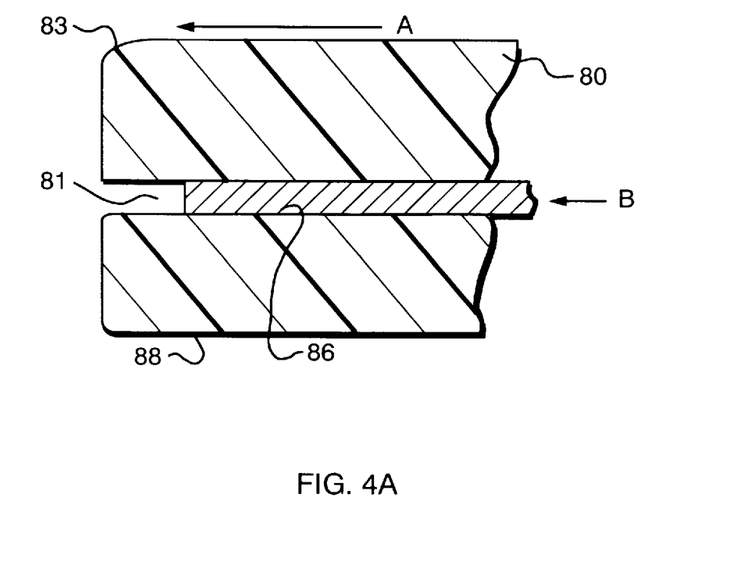
FIG. 4A is an enlarged, partial, cross sectional view of the wire insertion step of FIG. 3.

The cut, adhesive-coated wire is then inserted into the tube, step 72. One manner in which this may be accomplished is schematically depicted in FIG. 4A. Tube 80 with central aperture 81 is held in place, and adhesive-coated wire 86 is pushed into the other end of aperture 81 (not shown) and along aperture 81 a distance to place the wire approximately centered in the tube.

After the wire is inserted into the tube, the adhesive is activated by heating the wire with radio frequency energy, step 74. This method is used so that the foam of the foam body is not effected. The activation step may be accomplished in an RF cavity. Preferably, it is accomplished in a continuous process by moving the tube through an RF radiating antenna at a speed which is chosen so that the RF energy heats the wire sufficiently to melt the adhesive. This firmly adheres the foam tube to the wire along the entire length of the wire. The advantages of this adhesion are that, when the toy is bent in use, it has the feel of a bendable, formable foam piece, as opposed to a flexible foam piece with a bendable, formable core. It also prevents the metal core from slipping within the central aperture of the foam body, which additionally helps to prevent the ends of the wire from penetrating into, or entirely through, the foam body.

Figure 4B:
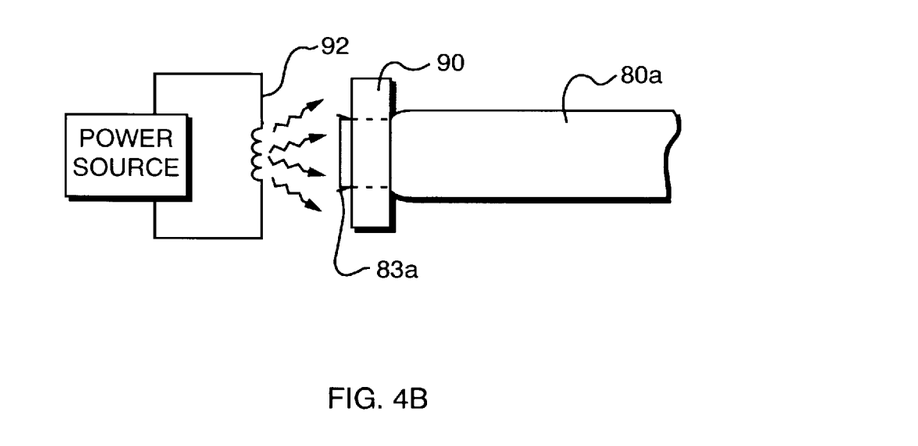
FIG. 4B is a schematic view of the heat sealing step of FIG. 3.

The tube ends are trimmed if necessary, step 76, to account for any tolerances in tube and wire length, so that the wire ends are actually at the desired distance from the ends of the foam tube. Preferably, the ends of the wire are about ⅜" from the ends of the tube. The aperture is then sealed at the ends of the foam tube using heat sealing, step 78, as shown in FIG. 4B. Tube 80a is clamped in an aperture in metal block 90 which is smaller in diameter than the normal diameter of tube 80a. This compresses the end portion of tube 80a, and the end face 83a of tube 80a, to the point where the aperture is closed. End 83a is then melted by the application of heat from radiant heat source 92 to hold the aperture closed. End 83a is then immediately struck with a cold die to form a continuous skin on the foam surface. A design can also be imprinted with the die. Preferably, about ⅛" of the tube ends are melted. This end finishing also helps to seal the wire within the tube and inhibit protrusion of the wire through the foam body. This also presents a finished end appearance without the need for separate end caps that are glued to the ends of tubes in other products.

Figure 5:
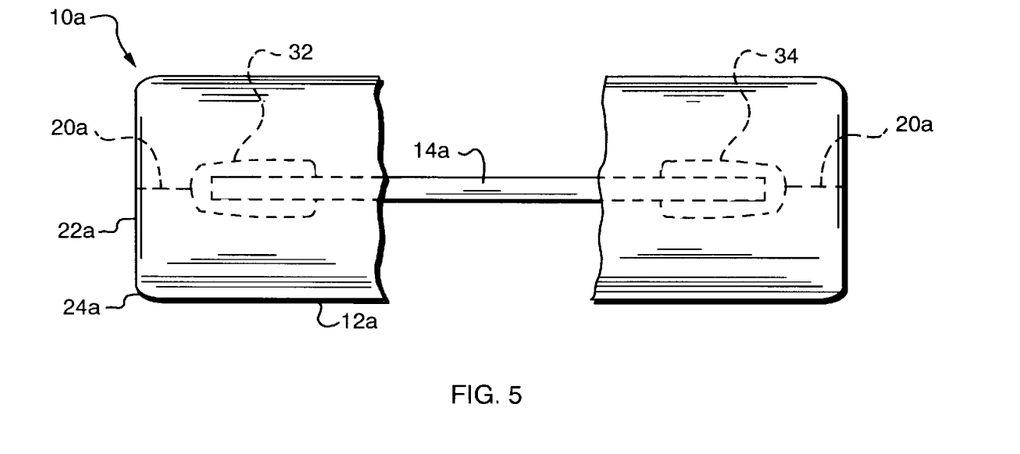
FIG. 5 is a view similar to that of FIG. 1 for another style of flexible foam construction toy made according to the method of this invention.
Figure 6A:
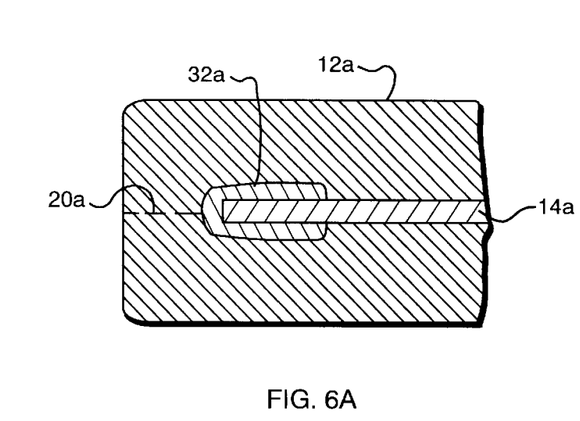
FIG. 6A is a partial cross sectional view of the toy of FIG. 4.
Figure 6B:
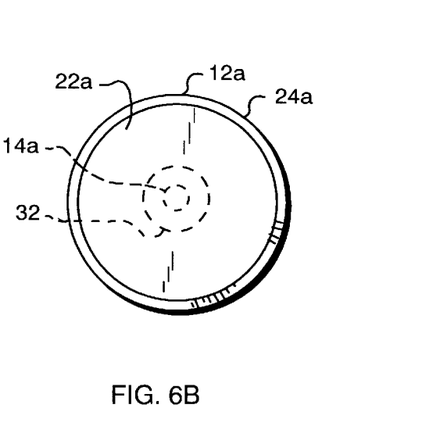
FIG. 6B is an end view of the toy of FIG. 4.

An alternative construction of toy 10a is shown in FIGS. 4 through 5. Wire 14a is provided with enlarged ends in this case by sealing or gluing caps 32 and 34 on the ends of the wire. These caps may be similar to wire nuts. Another type of enlarged end is made by looping the ends back on themselves. The construction may also be accomplished with two half foam pieces (such as half-circular cross-section) with or without a central channel, into one of which wire 14a is laid before the halves are folded around the wire and then adhered together, leaving seam 20a.

Figure 7A:
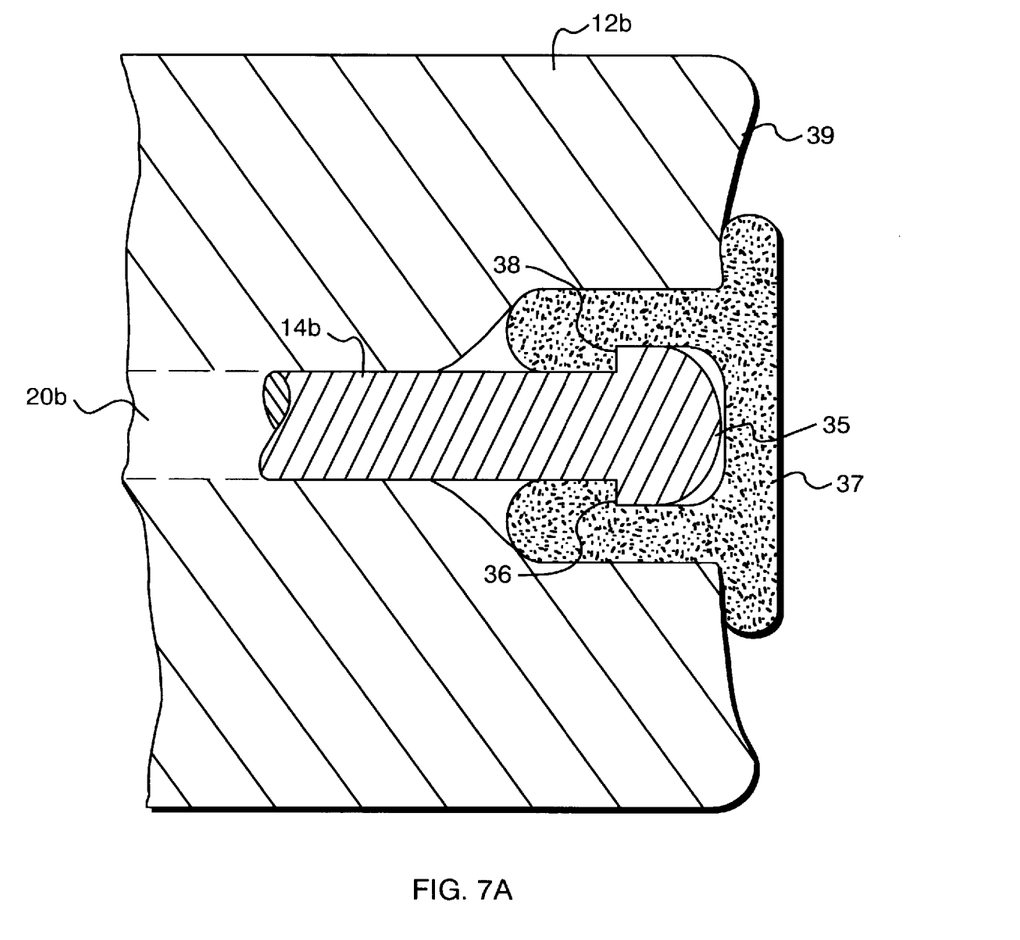
FIGS. 7A and 7B are a cross-sectional views of two embodiments of a flexible foam toy made by the method of this invention, detailing alternative manners of closing off the end of the foam body with a cap.
Figure 7B:
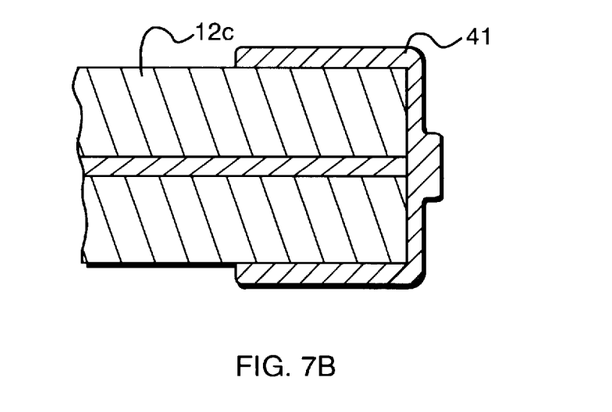

FIG. 7A details another manner of closing off the ends of the foam body to prevent the wire from poking out through the ends. This method can also be used to cap wire ends when the wire is as long as or longer than the foam body. Wire 14b has enlarged end 35 which can be formed by stamping. After wire 14b is inserted in channel 20b in the center of foam body 12b, plastic end cap 37 is fitted over the end of wire 14b. Cap 37 has shoulder 38 that snaps over and mates with corresponding shoulder 36 of wire 14b to keep cap 37 on the end of wire 14b. Cap 41, FIG. 7B, could alternatively be glued to the ends of the tube 12c and unfinished wire ends. This end-finishing scheme would be used in a case in which the wire and tube were coextruded, and thus coextensive in length, necessitating an end cap for both safety and aesthetic reasons.

Figure 8A:
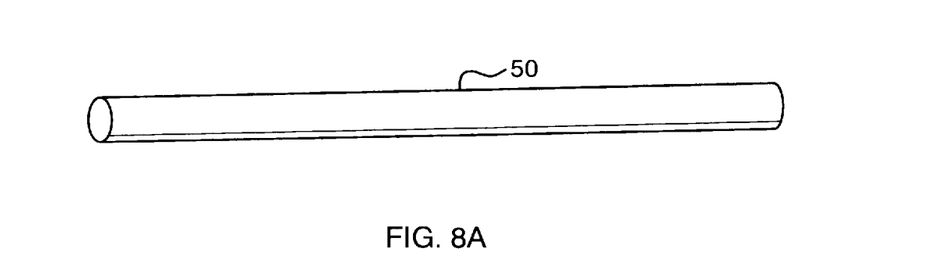
FIGS. 8A through 8D are an unbent and three bent shapes, respectively, of a flexible foam construction toy made by the method of this invention.
Figure 8B:
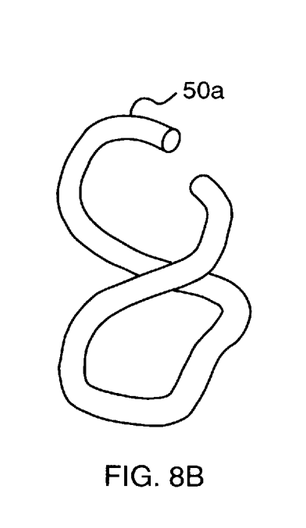

The foam construction toy of this invention can take any one or more of virtually unlimited shapes. In manufacturing, it is advantageous to choose shapes which may be extruded. One shape is a circular tube 50 through 50c, FIGS. 8A through 8D. Other shapes include square, triangular, oval and other cross sectional shapes that may be extruded. FIGS. 8B and 8D illustrate three of a virtually unlimited number of shapes which the tube toy may be bent into. At least some of the tubes preferably have a length to diameter ratio in the range of about 20:1 to 50:1 to allow them to be interconnected by wrapping around one another and still leave sufficient unwrapped free length to allow other interconnections to additional tubes or other shapes as shown in FIG. 9, which is a drawing of a fanciful assembly made with a number of flexible foam construction toy pieces made according to this invention. Rectangular base pieces 100 and 101 have a cylindrical hole for supporting cylindrical pieces 50d and 50e which in turn support the other pieces, including rectangular bars 90a and 90b which have thru-holes as shown, disk-shaped foam stampings 102 and 104 which may have holes for holding cylindrical foam pieces such as 50q, longer cylindrical bendable pieces 50f through 50h, shorter cylindrical foam pieces 50i through 50p, star-shaped stamped piece 106, triangular stamped piece 108, and saw-tooth stamped piece 106, which may each have one or more holes adapted to receive another piece of the set to allow the user to create fanciful designs.

Figure 8C:
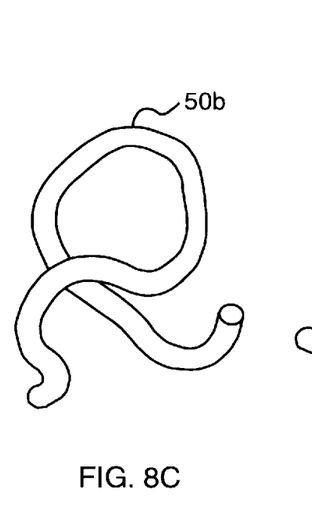
Figure 8D:
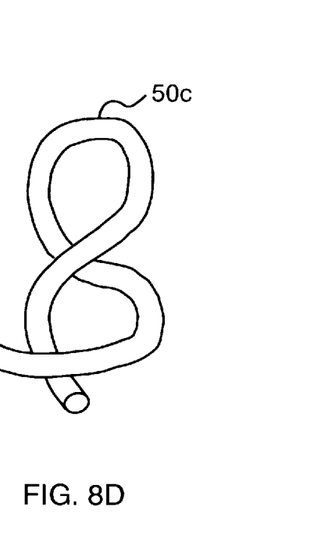
Figure 9:
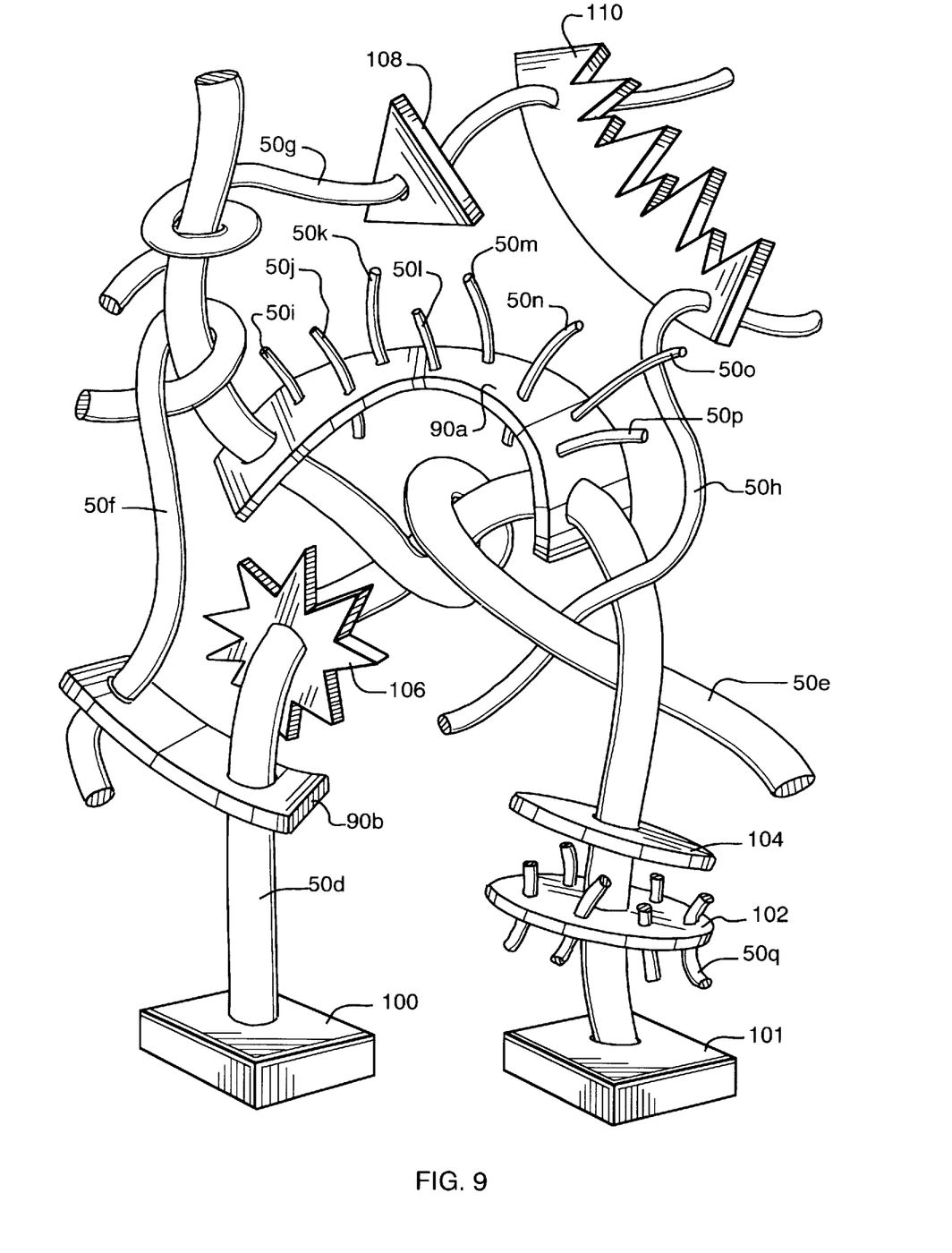
FIG. 9 is a view of a fanciful construction made with the construction toy resulting from this invention.

The toy pieces shown in FIGS. 8B and 8C have a length to width ratio of about 38. That of FIG. 8D has a ratio of about 35. Tube 50e of FIG. 13 has a ratio of about 32, and tube 50g has a ratio of about 36. These are illustrative rather than limiting, for illustrating the concept of the multiple wrapping interconnection that can be accomplished by such shapes.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A process for manufacturing an elongated, seamless, formable toy, having an elongated foam body, having two ends and a length to width radio of at least about 36:1, with a flexible wire embedded therein, and capable of interconnecting at virtually any point along the toy's length with another such toy, including the steps of:

extruding a seamless elongated foam body while simultaneously forming a central, full length, longitudinal aperture in the body open at both ends of the foam body;

then providing a flexible wire substantially coated with an adhesive;

inserting the adhesive-coated wire into one end of the elongated foam body through the central longitudinal aperture of the foam body; and then activating the adhesive to bond the wire to the foam body and therby form said toy.

2. The process of claim 1 further including the step of coining the wire ends, before the inserting step.

3. The process of claim 2 in which coining the wire ends occurs after the adhesive-coating step.

4. The process of claim 3 in which the aperture has a round cross section and a diameter essentially the same as the diameter of the adhesive-coated wire.

5. The process of claim 3 in which inserting the adhesive-coated wire includes pushing the wire into the foam body aperture.

6. The process of claim 1 wherein the wire is shorter than the foam body.

7. The process of claim 1, further comprising, after the inserting step, heat saeling the ends of the foam body.

8. A process for manufacturing an elognated, seamless, formable toy having an elongated foam body, having two ends and a length to width ratio of at least 36:1, with a flexible wire embedded therein, capable of interconnecting at virtually any point along the toy's length with another such toy, including the steps of:

extruding a seamless elongated foam body while simultaneously forming a central, full length, longitudinal aperture in the foam body open at both ends of the foam body;

providing an activatable adhesive coated wire;

coining the ends of the piece of wire, wherein the wire piece including the coined ends is shorter than the foam body;

inserting the coined-end wire piece into one of the open ends of the aperture of the foam body;

activating the adhesive to bond the foam body to the wire; and heat sealing the aperture closed at the foam body ends to assist in maintaining the wire within the foam body and thereby form said toy.

9. The process of claim 10, the closing step comprising heat sealing the ends of the foam body.

10. A process for manufacturing an elongated, seamless, formable toy having an elongated foam body, having two ends and a length to width ratio of at least about 36:1 with a flexible wire embedded therein, capable of interconnecting at virtually any point along the toy's length with another such toy, including the steps of:

provide a heat-activated adhesive coated wire piece with coined ends, and shorter than the elongated foam body;

pushing the coined-end wire into one of the open ends of the aperture of the foam body such that the wire is fully embedded in the foam body;

activating the adhesive with electromagnetic wave induction to bond the foam body to the wire; and closing the aperture at the foam body ends to assist in maintaining the wire with the foam body and thereby said toy.

extruding a seamless elongated foam body while simultaneously forming a central, full length, longitudinal aperture in the foam body, open at both ends of the foam body;

\* \* \* \* \*